May 2, 1967

R. HUBER 3,316,711

POWER PLANTS COMPRISING AT LEAST ONE MAIN GAS-ENGINE DRIVEN
BY POWER GAS SUPPLIED BY A GAS-GENERATOR AND AT LEAST
ONE AUXILIARY ENGINE

Filed April 18, 1958

2 Sheets-Sheet 1

INVENTOR
ROBERT HUBER
BY
Bailey, Stephens & Huettig
ATTORNEYS

INVENTOR
ROBERT HUBER
BY
Bailey, Stephens & Huettig
ATTORNEYS

United States Patent Office 3,316,711
Patented May 2, 1967

3,316,711
POWER PLANTS COMPRISING AT LEAST ONE MAIN GAS-ENGINE DRIVEN BY POWER GAS SUPPLIED BY A GAS-GENERATOR AND AT LEAST ONE AUXILIARY ENGINE
Robert Huber, Bellevue, France, assignor to Societe d'Etudes et de Participations Eau, Gaz, Electricite, Energie, S.A., Geneva, Switzerland, a society of Switzerland
Filed Apr. 18, 1958, Ser. No. 729,312
Claims priority, application France, Apr. 30, 1957, 737,576
The portion of the term of the patent subsequent to May 1, 1978, has been disclaimed
6 Claims. (Cl. 60—13)

This invention relates to power plants of the kind comprising at least one main gas-engine driven by power gas supplied by a gas-generator and at least one auxiliary engine. The invention relates more particularly but not exclusively to power plants of the kind specified wherein the main gas-engine is in the form of a gas-turbine.

In such power plants the load on the main gas-engine which serves, for instance, to drive a ship or locomotive, and the load on the auxiliary engine which serves, for instance, to generate electric power for supplying auxiliary electrical machinery, lighting installations or the like on board a ship or locomotive, are both variable between wide limits and load variations of both engines are not interrelated in any fixed way.

It has been conventional heretofore for the installation comprising the main gas engine to be completely separate from the installation comprising the auxiliary engine. The auxiliary engine has usually heretofore been in the form of a diesel engine which, although its maximum power is high and often represents a considerable proportion of the maximum power of the main engine, does not have sufficiently large cylinders to run on heavy oil but requires as a fuel relatively expensive gas oil.

It is an object of the invention to provide an improved power plant of the kind specified such that both the first cost and the fuel cost for the auxiliary engine or engines are reduced in comparison with known plants of this kind.

According to the present invention in a power plant of the kind above referred to the main gas-engine is supplied with power gas from one or more gas-generators through a conduit containing a throttle valve and the auxiliary engine is driven by power gas derived from a region of the said conduit upstream of the throttle valve.

The throttle valve may be controlled at least partly in dependence upon gas pressure in the said conduit in such a manner that the throttle tends to close when the pressure of the gas supplied to the main engine falls below a predetermined value.

Figure 1:
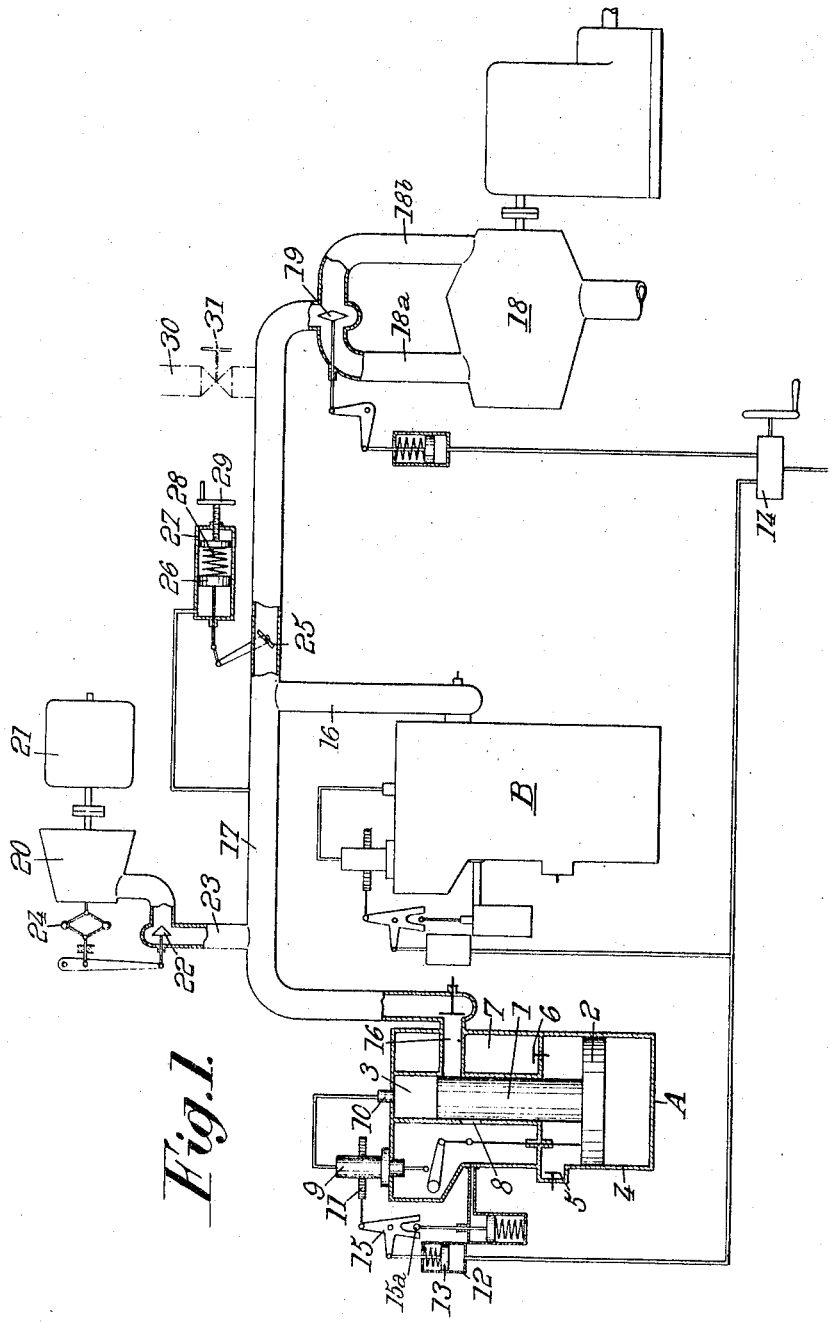

In the annexed drawings:

FIG. 1 diagrammatically illustrates a power plant according to this invention.

Figure 2:
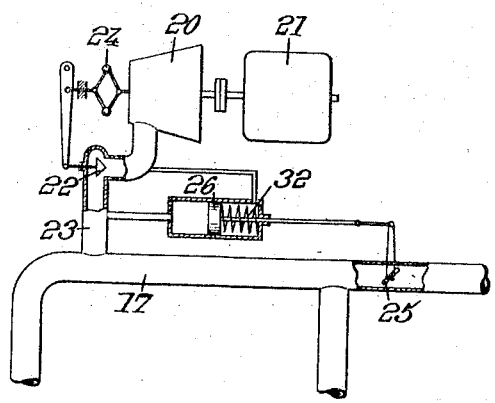
Figure 3:
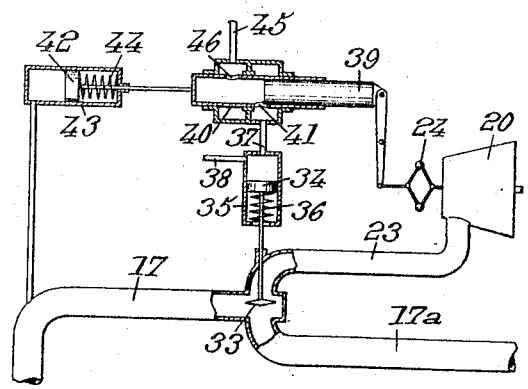

FIGS. 2 and 3 illustrate two modifications of the means for controlling the throttle member in a power plant according to the invention.

Depending upon the size of the power plant, the latter may comprise one or preferably a plurality of gas-generators. The plant shown in FIG. 1 comprises two gas-generators A and B, preferably of the free-piston type. These gas-generators may be of appropriate design, for instance as diagrammatically indicated in the case of the gas-generator A shown in section, which comprises a combustion piston 1 rigidly secured to a compressor piston 2, a combustion cylinder 3 in which the combustion piston 1 operates, and a compressor cylinder 4 divided by piston 2 into two chambers, the innermost one of which forms the compressor cylinder proper and has inlet valves 5 and delivery valves 6, while the outermost chamber forms a pneumatic return energy accumulator or cushion. Air compressed in the inner chamber of cylinder 4 is delivered to an engine-case 7 which surrounds combustion cylinder 3, communicating therewith through apertures 8 when piston 1 is near its outer dead centre position. A fuel injection pump 9 supplies an injector 10 fitted to the combustion cylinder 3, the deliverey of pump 9 being controlled conventionally by a control member 11, for instance in the form of a toothed rack, pump 9 being driven through appropriate linkage by the compressor piston 2. Control member 11 is actuated by a piston 13 in a cylinder 12 operated by the pressure of an operating fluid, the pressure of which is controlled either by a regulator or by a manual control 14, piston 13 being connected with member 11 by a bell-crank lever 15, the movements of which are limited by a stop 15a operated by the air pressure within the engine-case 7. A conduit 16 is connected at one end to the exhaust ports of the combustion cylinder 3 and at the other end to a header 17 to which all the gas-generators of the power plant are connected, conduit 16 conveying to header 17 the power gases which issue from the exhaust ports of cylinder 3 and which are formed of a mixture of combustion gases incompletely expanded in the combustion cylinder 3 with the excess of scavenging air which is derived from the engine-case 7 and has passed through cylinder 3.

Gas-generator B, which is shown only in outline, is arranged in the same manner as gas-generator A.

It should also be noted that in practice all the gas-generators instead of having only one set of pistons 1-2 are provided with two such sets moving in opposite directions in a combustion cylinder and interconnected by synchronising means, their compressor pistons such as 2 co-operating with cylinders such as 4 disposed on either side of the combustion cylinder such as 3. It is known that these gas-generators, which have variable-stroke pistons, can supply power gas of which the pressure and amount delivered per stroke are variable, so that the delivery from such gas-generators may readily be adapted to the requirements of a gas turbine which is to be supplied with power gas having a pressure and rate of flow adapted to be varied in accordance with the load on the turbine.

In the power plant shown in FIG. 1 the main engine adapted to be supplied with power gas from the gas-generators is in the form of a complex turbine 18 comprising two single turbines, one for reverse running and the other for forward running. These turbines are supplied through two conduits 18a and 18b adapted to be connected to the header through the agency of a control member 19 which, depending upon its setting, either directs all the gases through the conduit 18a into the turbine for forward running or directs all the gases through the conduit 18b into the turbine for backward running or directs simultaneously some of the gases into the turbine for forward running and the rest into the turbine for backward running, as described in the specification of French Patent No. 998,606. Control member 19 is hydraulically operated from the manually controlled member 14 which also controls the fuel regulating members 11 of the prime movers.

In applying to this power plant the main feature of the invention, the header 17 is not only connected with the main turbine 18 but also with an auxiliary turbine 20 driving an electric generator 21 which produces electric power for shipboard electrical installations, lighting or the like, and the quantity of gas derived from header 17 for this auxiliary turbine 20 is controlled by a throttle member 22 which is disposed in the conduit 23 connecting the inlet of turbine 20 to header 17, this throttle member 22 being controlled, for instance, by a speed governor 24 driven by turbine 20.

As long as the load on the main turbine is relatively high the pressure operative within header 17 and which corresponds to main turbine loading will satisfy the requirements of the auxiliary turbine 20, but when the load on the main turbine 18 drops to a relatively low value, for instance during manoeuvring associated with a reversal of the direction of travel, the pressure at the main turbine inlet will become too low for the auxiliary turbine which at that precise moment often has to deliver a relatively high power to supply the auxiliary shipboard machinery with electricity. A throttle member 25 is therefore provided in header 17 between the inlet of conduit 23 in the said header 17 and the main turbine 18. The throttle member 25 is controlled in dependence upon the pressure in the conduit connecting the gas-generator or gas-generators with the main turbine 18, preferably in dependence upon the pressure in header 17 upstream of throttle member 25.

As long as the load on the main turbine 18 is normal, throttle member 25 is fully open and so does not cause any pressure drop, but if, when the ship is manoeuvred or for other reasons, the gas pressure at the turbine inlet, and therefore in header 17, drops below a predetermined value, throttle member 25 closes more or less completely and maintains, upstream of itself, a pressure higher than the pressure downstream of itself. A power gas pressure is therefore maintained for the auxiliary turbine 20 which is adequate for the maximum loads which turbine 20 may have to sustain.

As may be seen in FIG. 1, throttle member 25 is in the form of a flap controlled by a piston 26 which moves in a cylinder 27, the pressure operative in header 17 upstream of flap 25 acting on one of the sides of piston 26 while the other side thereof is acted upon by a spring 28, the compression of which can be adjusted, for instance by a handwheel 29. By varying the compression of spring 28, the minimum pressure operative in header 17 upstream of flap 25 may be varied. Flap 25 also maintains the supply pressure of the auxiliary turbine 20 at a suitable value when the main turbine 18 is stopped, for instance at berthing. The fuel-controlling member 11 is then at a position determined by co-operation of stop 15a with lever 15 and corresponding to minimum stroke of the pistons of the gas-generator. The excess of power gas produced can escape either through turbine 18 or through a by-pass 30 which is connected to header 17 downstream of the throttle member and which is controlled by a manually controllable valve 31.

It will be apparent from the foregoing that control of the main turbine 18 is completely independent of control of the auxiliary turbine 20 which can therefore provide maximum power when the main turbine is providing minimum power and vice versa.

In the modification shown in FIG. 2, throttle member 25 is controlled by the difference between the pressures upstream and downstream of the power-regulating member 22 of the auxiliary turbine 20. For this purpose, the piston which controls the variable position of throttle member 25 has one of its sides acted upon by the pressure upstream of control member 22 and the other side acted upon by the pressure downstream of member 2 and also by a spring 32.

If the pressure in header 17 drops while the ship is being manoeuvred, the speed governor 24 of the auxiliary turbine tends to open control member 22 so that the difference between the pressures on either side of member 22 decreases. As soon as such pressure difference drops below a predetermined value, spring 32 acts on piston 16 in a direction tending to close throttle member 25. Pressure in header 17 upstream of the member 25 is therefore adapted automatically to the load on the auxiliary turbine 20.

According to another modification which is shown in FIG. 3, a single member 33 acts both as a control member for the auxiliary turbine 20 and as a throttle member for the gases passing to the main turbine 18. For this purpose, another pipe 17a is connected to header 17 opposite the region where the conduit 23 is connected to the said header 17. Conduit 17a conveys the gases to the main turbine 18 and member 33 is provided between these two connections. Hence when at the upper position member 33 serves to throttle the gases flowing through conduit 23 to the auxiliary turbine 20, while at its lower position member 33 serves to throttle the gasses flowing through pipe 17a to the main turbine 18. As long as the pressure of the gases in header 17 and at the inlet to turbine 18 is sufficiently high, the auxiliary turbine 20 is controlled by throttling the gasses at the inlet to conduit 23, but if, for instance when the ship is manoeuvred, the gas pressure decreases at the inlet to the main turbine and in the header, member 33 drops, throttles the gases flowing from header 17 into pipe 17a and thus maintains, at the entry to conduit 23, sufficient pressure for the auxiliary turbine 20 to provide the power required of it.

Advantageously, in order that member 33 may operate in the manner hereinbefore described, it is controlled both by the governor 24 of the auxiliary turbine 20 and also by the pressure in the header 17.

In the embodiment illustrated in FIG. 3, control member 33 is controlled by a piston 34 which moves in a cylinder 35 and which has a spring 36 acting on one side, its other side being submitted to the pressure of a control fluid which is supplied to cylinder 35 through a tube 37 and which may escape from cylinder 35 through a calibrated tube 38. The pressure of this fluid, as for instance oil, is controlled by a plunger piston 39, the position of which is determined by the speed governor 24 of turbine 20 and which cooperates with a hollow side valve 40 formed with an aperture 41 in its wall, plunger piston 39 being adapted to open aperture 41 to variable extents. The position of slide valve 40 is controlled by a piston 42 slidable within a cylinder 43 and which has the pressure operative in header 17 acting on one of its sides and a spring 44 acting on its other side. The control fluid is supplied through a conduit 45, passes into slide valve 40 through an aperture 46 therein and issues therefrom through aperture 41 into conduit 37.

As long as the pressure in the header is high enough, the position of control member 33 depends solely upon the governor 24 of turbine 20, the said governor controlling closure of aperture 41 through the agency of plunger piston 39. When the pressure in header 17 falls below its predetermined value, piston 42 moves to the left and thus increases the useful cross-section of aperture 41. Control member 33 therefore takes up a lower position for which it throttles the gases flowing from header 17 into conduit 17a. At this new position governor 24 operates to maintain the pressure within header 17 at a value corresponding to the power required from the auxiliary turbine 20.

If the power plant comprises a plurality of gas-generators, throttle member 25 or control member 33 may be disposed immediately after the connection of the first, second, third, etc., gas-generator with the header.

FIG. 1 shows the case where throttle member 25 is fitted after the connection of the second gas-generator B. This provides a high degree of reliability, because, even in the case of inspection or failure of one of the gase-generators, the auxiliary turbine 20 is still fed by the other gas-generator or gas-generators connected to the header upstream of the throttle member.

I claim:

1. A power plant comprising a gas-generator adapted to produce power gases under pressure; a main gas-engine to which power gases are supplied by said gas-generator; a main gas conduit to convey power gases from said gas-generator to said main engine; an auxiliary gas-engine; an auxiliary feed conduit extending between said gas-generator and said auxiliary gas-engine in shunt with said main gas conduit; the respective shafts of said auxiliary engine and said main engine being wholly independent of each other; the gas inlet of each of said gas-engines being wholly independent of the gas outlet of the other gas-engine, and valve means in said main gas conduit and said auxiliary conduit for controlling the distribution of the gaseous stream from said gas-generator to said two gas-engines respectively, said valve means being responsive at least to variations of the pressure in said main gas conduit upstream of said valve means for closing at least partly the flow of said gaseous stream to said main gas-engine when the power gas pressure to be provided at the intake of said main gas-engine becomes lower than a given value.

2. A power plant according to claim 1 wherein said valve means are further responsive to the speed of said auxiliary gas-engine.

3. A power plan comprising a gas-generator adapted to produce power gases under pressure; a main gas-engine to which power gases are supplied by said gas-generator; a main gas conduit to convey power gases from said gas-generator to said main gas-engine; a main throttle member interposed in said main gas conduit to create a pressure drop in said conduit; an auxiliary gas-engine; an auxiliary feed conduit extending between said gas-generator and said auxiliary gas-engine in shunt with the portion of said main gas conduit extending between said gas-generator and said throttle member; the respective shafts of said auxiliary engine and said main engine being wholly independent of each other; and the inlet of each of said gas-engines being wholly independent of the outlet of the other gas-engine, and means responsive at least to variations of the pressure in said main gas conduit upstream of said main throttle member for closing said throttle member at least partly when the power gas pressure to be provided at the intake of said main gas-engine becomes lower than a given value.

4. A power plant according to claim 3 wherein the last mentioned means are further responsive to the speed of said auxiliary gas-engine.

5. A power plant according to claim 2 wherein said main gas conduit branches off into two branch conduits, the first one leading to said main gas-engine and the second one leading to said auxiliary gas engine and said valve means consist of a single valve movably mounted at the place where both of said branch conduits start from said main conduit, said single valve being arranged to control simultaneously both of said branch conduits.

6. A power plant which comprises, in combination, a gas-generator capable of producing power gases under pressure, a main gas engine, an auxiliary gas engine, the load of said auxiliary gas-engine being wholly independent of that of said main engine, a conduit for conveying power gases from said gas-generator to the intake of said main engine, a conduit for conveying power gases from said gas generator to the intake of said auxiliary engine, a throttle member in said first mentioned conduit, a throttle member in said second mentioned conduit, said second mentioned throttle member being in shunt with said first mentioned throttle member, a speed governor mounted on said auxiliary engine to control said second mentioned throttle member, and means responsive to variations of the difference between the pressures in said second mentioned conduit respectively upstream and downstream of said last mentioned throttle member for closing said first mentioned throttle member at least partly when the power gas pressure to be provided at the intake of said main engine becomes lower than a given value.

References Cited by the Examiner

UNITED STATES PATENTS 2,095,991 10/1937 Lysholm _____ 60—39.15 X
2,147,935 2/1939 Steiner _____ 60—13

FOREIGN PATENTS 599,502 3/1948 Great Britain.
685,943 1/1953 Great Britain.

EDGAR W. GEOGHEGAN, *Primary Examiner.*

JULIUS E. WEST, SAMUEL LEVINE, C. CURRY, L. E. CARNAGAN, *Assistant Examiners.*